United States Patent [19]

Espy et al.

[11] Patent Number: 5,338,807
[45] Date of Patent: Aug. 16, 1994

[54] SYNTHESIS OF CREPING AIDS BASED ON POLYAMIDES CONTAINING METHYL BIS (3 AMINOPROPYLAMINE)

[75] Inventors: Herbert H. Espy, Wilmington, Del.; William W. Maslanka, Landenberg, Pa.

[73] Assignee: Hercules Incorporated, Wilmington, Del.

[21] Appl. No.: 814,734

[22] Filed: Dec. 23, 1991

[51] Int. Cl.⁵ ............................................. C08G 69/48
[52] U.S. Cl. ................................. 525/430; 524/606; 525/435; 528/342
[58] Field of Search ............... 525/430, 435; 524/606; 528/342

[56] References Cited

U.S. PATENT DOCUMENTS

| | | | |
|---|---|---|---|
| 3,311,594 | 3/1967 | Earle, Jr. | 260/77.5 |
| 3,640,841 | 2/1972 | Winslow et al. | 162/164 |
| 4,487,884 | 12/1984 | Maslanka | 525/430 |
| 4,501,640 | 2/1985 | Soerens | 162/111 |

FOREIGN PATENT DOCUMENTS 979579  12/1975  Canada ..................... 402/62

*Primary Examiner*—Harold D. Anderson
*Attorney, Agent, or Firm*—Roy V. Jackson

[57] ABSTRACT

A creping aid comprising the reaction product of a polyamide of a dibasic acid or of the ester of an aliphatic dibasic acid and methyl bis(3-aminopropylamine) with epichlorohydrin in a mole ratio of the polyamide to the epichlorohydrin between about 1:0.1 and about 1:0.33, and a composition comprising an aqueous solution of the creping aid.

8 Claims, No Drawings

SYNTHESIS OF CREPING AIDS BASED ON POLYAMIDES CONTAINING METHYL BIS (3 AMINOPROPYLAMINE)

BACKGROUND OF INVENTION

In the manufacture of certain wet-laid paper products, such as facial tissue, bathroom tissue, or paper towels, the web is conventionally subjected to a creping process in order to give it desirable textural characteristics, such as softness and bulk. The creping process involves adhering the web to a rotating creping cylinder, such as the apparatus known as a Yankee dryer, and then dislodging the adhered web with a doctor blade. The impact of the web against the doctor blade ruptures some of the fiber-to-fiber bonds within the web and causes the web to wrinkle or pucker.

The severity of this creping action is dependent upon a number of factors, including the degree of adhesion between the web and the surface of the creping cylinder. Greater adhesion causes increased softness, although generally with some loss of strength. In order to increase adhesion, an adhesive creping aid is used to enhance any naturally occurring adhesion that the web may have due to its water-content, which will vary widely depending on the extent to which the web has been previously dried. Creping aids also should prevent wear of the dryer surface and provide lubrication between the doctor blade and the dryer surfaces and reduce chemical corrosion, as well as controlling the extent of creping.

In order to provide a coating that is durable enough to withstand the mechanical forces under the conditions of heat and/or moisture at the doctor blade, it is desirable to use a resin having some ability to thermoset, i.e., to lose solubility and fusibility by crosslinking. However, the ability to impart wet strength to paper also depends on the thermosetting nature of the resin. In wet-strength grades such as facial tissue, napkin stock, toweling, and the like, it is known that some wet-strength resins can function concurrently as creping aids. However, in non-wet-strength grades such as bathroom tissue, it is desirable to restrict the thermosetting ability of the resin, so as to provide a durable coating on the dryer while limiting the potential development of wet strength in the paper.

An adhesive creping aid, as an aqueous solution or dispersion, is usually sprayed onto the surface of the creping cylinder. Alternatively, it can be added at the wet end of the paper machine, e.g., to the pulp before formation of the sheet, by spraying onto the wet web, etc. Spraying on the dryer surface will minimize the chance that a durable, relatively highly thermosetting resin could transfer to the sheet during creping, to impart possibly undesired wet-strength to a non--wet--strength grade. However, any corrosive ions present in a resin would be concentrated on the dryer surface by this technique. Conversely, adding resin at the wet end of the paper machine would increase the wet-strength development by the more reactive thermosetting resins, but by diluting any corrosive ions in the white water, it would minimize their concentration at the dryer surface.

U.S. Pat. No. 4,501,640 discloses a creping adhesive comprising an aqueous mixture of a polyvinyl alcohol and a water-soluble, thermosetting, cationic polyamide resin that is the reaction product of epichlorohydrin and a polyamide having secondary amine groups derived from a polyalkylene polyamine and a saturated aliphatic dibasic carboxylic acid containing from 3 to 10 carbon atoms. The patent states that the polyvinyl alcohol is necessary to avoid hardening of the resin by diluting it. The resins employed by this patent are thermoserring wet-strength resins, made with relatively high ratios of epichlorohydrin to amine groups in the base polyamide. If they are added at the wet end, they will impart wet strength. If they are sprayed on the dryer surface, they will carry a relatively high content of potentially corrosive chloride ion into the adhesive film.

Canadian Patent 979,579 discloses a creping aid that is the reaction product of epichlorohydrin and a polyaminopolyamide containing secondary amine nitrogen atoms, such as adipic diethylenetriamine polyamide, that has been alkylated with an alkylating agent or with a combination of formaldehyde and formic acid. All of the resins it describes require the additional alkylation process step in their manufacture, and some of its versions have the disadvantage that some residual formic acid or formate ion is carried over to the final resin. Such resins, if sprayed on the dryer surface, would carry residual formate ion as a component of the dryer coating.

U.S. Pat. No. 3,311,594 discloses a wet-strength additive for paper comprising the water-soluble reaction product of epichlorohydrin and a polyamide prepared by reacting a polyamine having at least three amine groups of which at least one is tertiary, with a saturated aliphatic dibasic carboxylic acid containing from 3 to 10 carbon atoms. The reaction product is water soluble but becomes crosslinked and insoluble on drying. The operable polyamines disclosed include methyl bis(3-aminopropylamine), usually referred to as MBAPA. These thermosetting wet-strength resins are made using a ratio of about 0.8 to about 2.0 moles of epichlorohydrin per mole of amine in the polyamide, or preferably about 1.0 to about 1.7 moles of epichlorohydrin per mole of amine. These resins are stabilized for storage by treatment with hydrochloric acid to convert the epoxide functional groups to chlorohydrin groups, which are then dehydrohalogenated to epoxide by an alkali treatment before use. The resins of this patent are thus highly functionalized, effective wet-strength resins, containing substantial amounts of chloride ion under conditions of their intended use. They would impart substantial wet-strength to the sheet if added at the wet end of the paper machine, and could potentially contribute to corrosion problems if applied to a Yankee dryer surface by spraying.

U.S. Pat. No. 3,640,841 discloses the manufacture of paper using as an adhesion aid, a polyaminopolyamide made from an aromatic or aliphatic dicarboxylic acid and a polyalkylene polyamine with two primary amino groups and at least one amino group which is either secondary or tertiary. The resins of this patent are described as having substantially no effect on wet strength of the paper, and as being easily soluble in water. Although their lack of wet strength makes them usable by wet-end addition to grades where wet strength is not wanted, they thus lack the self-insolubilization that is desired for durability of the coating on the Yankee dryer.

It is recognized in the industry that there is a need that is not met by the known compositions for a creping aid that does not contain undesirable residual chemicals and helps to produce paper with the right balance of strength, stretch ability, softness, and absorbency.

SUMMARY OF THE INVENTION

This invention provides an effective creping aid that is the direct reaction product of the reaction product of a polyamide of a dicarboxylic acid or the ester of an aliphatic dicarboxylic acid and methyl bis(3-aminopropylamine), with epichlorohydrin, in aqueous solution and in a mole ratio of the polyamide to the epichlorohydrin between about 1:0.1 and about 1:0.33, with the total concentration of the reactants preferably being from 10 to 50%.

The reaction minimizes steps that might produce harmful residuals, and the reaction product provides a creping aid that yields a sheet of paper with the right balance of properties.

The product of the invention also has the advantage that the structure and solubility of the dibasic acid used can be selectively varied to meet specific creping needs.

DETAILED DESCRIPTION OF INVENTION

The creping aids of this invention, which are synthesized by directly reacting the polyamides of a dicarboxylic acid or the ester of an aliphatic dicarboxylic acid and methyl bis(3-aminopropylamine) in aqueous solution, with epichlorohydrin, using a mole ratio between about 1:0.1 and about 1:0.33, preferably are produced using a mole ratio between about 1:0.20 and about 1:0.30.

The dicarboxylic acids can include saturated and unsaturated dicarboxylic acids having 2 to about 12 carbon atoms, including by way of example, oxalic, malonic, succinic, glutaric, adipic, pilemic, suberic, azelaic, sebacic, maleic, fumaric, itaconic, phthalic, isophthalic and terephthalic acids. Adipic and glutaric acids are preferred, with adipic acid being most preferred. The esters of the aliphatic dicarboxylic acids, and aromatic dicarboxylic acids, such as the phthalic acid, may be used, as well as combinations of such dicarboxylic acids or esters.

The intrinsic viscosity of the precursor polyamide may range from 0.090–0.225 dl/g with a preferred range being 0.10–0.20 dl/g. It is most preferred to terminate the reaction of the polyamide with epichlorohydrin when the reaction mixture has reached a Gardner-Holdt viscosity between about " F" and about " L", at a solids content of about 30%.

For storage and sale, the resins are preferably diluted with water to a solution containing 12.0%–30.0% total solids, with 24%–26% total solids being preferred. For use as creping aids on the paper machine, the resins may be diluted further as desired before addition or spray application. The Brookfield viscosity range is from about 20 to about 500 cps as measured at a total solids content of 25%, with a viscosity range of about 40 to about 90 cps being preferred.

The general formulas representing the polyamide and resin used in this invention are:

POLYAMIDE:

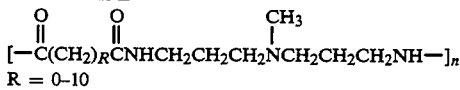

R = 0–10

RESIN:

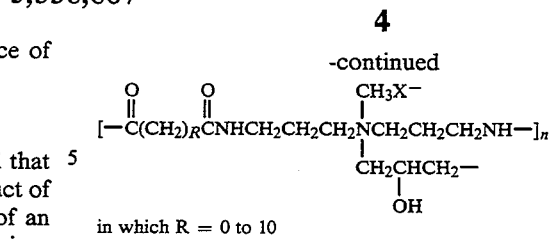

in which R = 0 to 10

EXAMPLE 1

SYNTHESIS OF POLY(ADIPIC ACID-CO--METHYL BIS(3-AMINOPROPYLAMINE)-EPICHLOROHYDRIN RESIN

Methyl bis(3-aminopropylamine) [MBAPA, 218.0 g, 1.5 moles] was charged to the reaction vessel. Adipic acid (219.2 g, 1.5 moles) was added over a period of about 30 minutes. This was accompanied by an exotherm of about 30°–40° C. The temperature was raised to 170°–171° C. and held for three hours while the water from the polycondensation was removed. The polyamide was diluted with about 350 cc of water. The final solution had a total solids of 51.4% with intrinsic viscosity of 0.112 dl/g (1M $NH_4Cl_2$%, 25° C). A portion of the above solution (149.2 g, 51.4% solution, equivalent to 76.7 g solids, 0.3 mole) was charged to the reaction vessel and adjusted to 29–30% solids if necessary. The pH was adjusted from 9.8 to 8.5 with 7.5 g of 96.8% $H_2SO_4$. Epichlorohydrin (6.9 g, 0.075 mole, mole % ratio, 0.25 to 1) was added and the temperature raised to 53°–54° C., representing a mol percentage ratio of 0.25 to 1. The viscosity was monitored with Gardner-Holdt tubes. At Gardner-Holdt " H-I", the reaction was terminated by adding 98 cc of water and adjusting the pH to 3.8–4.0 using 96.8% $H_2SO_4$.

In this particular case, the sample was divided into three parts and stabilized at pH 3.8, 3.5, and 3.0. The total solids were 25.4% and Brookfield viscosity determined to be 61 cps (#1 spindle, 60 rpm, 25° C.). All of the resins were stable to gelation during storage at 90° C. for three months.

EXAMPLE 2

SYNTHESIS OF POLY (GLUTARIC ACID-CO-METHYL BIS (3-AMINOPROPYLAMINE)-EPI-CHLOROHYDRIN RESIN

Methyl bis(3-aminopropylamine) [MBAPA, 218.0 g, 1.5 moles] was charged to the reaction vessel. Glutaric acid (198.2 g, 1.5 moles) was added over a period of 25 minutes. An exotherm of approximately 40 minutes accompanied the addition. The temperature was raised to 170°–171° C. and held for one hour while the water of polycondensation was removed. The polyamide was diluted with 325 cc of water and cooled to room temperature. The total solids of the aqueous solution was 51.6% and the intrinsic viscosity of the polyamide was 0.103 dl/g (1 M $NH_4Cl$, 2%, 25° C.).

A portion of the above solution (140.4 g, 51.6% solution, equivalent to 72.5 g solids, 0.30 mole) was charged to the reaction vessel and adjusted to 29–30% solids if necessary. The pH was adjusted from 9.6 to 8.5 with 96.8% $H_2SO_4$. Epichlorohydrin (4.9 g, 0,056 mole) was added and the temperature raised to 51°–52° C. At Gardner--Holdt viscosity of " F--G" the reaction was terminated by adding 93 cc of water and adjusting the pH to 3.8–4.0 with 96.8% $H_2SO_4$. In this particular case, the resin was divided into three parts, and the pH adjusted to 4.0, 3.5, and 3.0. The total solids were 24% and Brookfield viscosity determined to be 40 cps (#1 spindle, 60 rpm, 25° C.). All of the resins were stable to gelation during storage at 90° F. for three months.

EXAMPLE 3

SYNTHESIS OF POLY (AZELAIC ACID-CO--METHYL BIS (3-AMINOPROPYLAMINE)-EPICHLOROHYDRIN RESIN

Methyl bis(3-amino propylamine)[MBAPA, 218.0 g, 1.5 moles] was charged to the reaction vessel. Azelaic acid (282.3 g, 1.5 moles) was charged to the reactor over a period of about 40 minutes. An exotherm of approximately 20° C. accompanied the addition. The temperature was raised to 170° C. and held for the three hours while the water from the polycondensation was removed. The polyamide was isolated by pouring the contents of the reactor into an aluminum pan and allowed to cool. The intrinsic viscosity was determined to be 0,106 dl/g ($1MNH_4Cl_2$%, 25° C.).

A portion of the polyamide (59.5 g, 0.20 mole) prepared above was dissolved in 144 cc of water containing 6.0 g of 96.8% $H_2So_4$. Epichlorohydrin (4.6, 0.05 mole, mole % ratio, 0.25 to 1) was added, and the temperature raised to 55°-58° C. At Gardner--Holdt viscosity "F-G" , the reaction was terminated by adding 72 cc of water and adjusting the pH to 3.9 with 96.8% $H_2SO_4$. The total solids of the final resin were 25.1% and the Brookfield viscosity determined to be 55 cps (#1 spindle, 60 rpm, 25° C.). The resin was storage-stable for more than three months.

The Example was repeated with a mole % ratio of epichloro-hydrin to polyamide of 0.175 to 1 (30% less).

EVALUATION PROCEDURE

The resins were evaluated as creping adhesives using the method described in U.S. Pat. No. 4,501,640 (D. A. Soerens). Kymene®557 was cited as a control for the work described in the that patent. The evaluations of the creping aids according to the invention included Kymene®557 and Creptrol®190 as resin controls. (Kymene 557 resin is a wet-strength resin and Crepetrol 190 is a creping adhesive resin, commercially available from Hercules Incorporated).

PREPARATION OF SAMPLES FOR THE MODIFIED 180° PEEL TEST

1. Clean 2"×5"×1/16" stainless steel plates with soap and water, dry, wipe with hexane, and dry.
2. Cast a film of the creping aid resin onto $\approx$4" of the stainless steel plate with a #26 wire wound rod. Allow film to dry overnight.
3. Place coated stainless steel plate on a 200° F. hot plate for five minutes.
4. Soak a 1"×8" cotton cloth strip (×3.20 oz./yd$^2$) 60 seconds in distilled water and hold upright to drain off excess water for $\approx$60 seconds.
5. Place the wet cotton strip on the coated stainless steel plate on the hot plate and roll with a 1000 g roller to laminate cloth to the film.
6. Allow laminate to dry for two minutes on the hot plate after rolling.
7. Submit samples for modified 180° Peel Test at 99° C. with a crosshead speed equal to 6"/minute.

N.B. A.S.T.M. Test D-903 was used as a guide with modifications as follows: 1" sample vs. 2" and crosshead speed set at 6"/min. vs. 12"/min .

Comparative test results of Examples 1 and 3 are listed in Table 1, using Crepetrol® and Kymene® as controls for comparison. The data in the table demonstrate that the samples of the current invention compare quite well to the controls Crepetrol®190 and Kymene®557H.

TABLE 1

| Designation | Sample | Average Peel Strength (lbs./in.) | Peak Peel Strength (lbs./in.) |
| --- | --- | --- | --- |
| Control | Crepetrol ® 190 | 0.08 | 0.13 |
| Example 1[1] | Adipic acid-MBAPA | 0.08 | 0.14 |
| Example 3[2] | Azelaic acid-MBAPA | 0.07 | 0.13 |
| Low Epi[3] | Azelaic acid-MBAPA | 0.13 | 0.23 |
| Control | Kymene ® 557H | 0.14 | 0.40 |

[1]Mole % ratio = 0.25/1
[2]Mole % ratio = 0.25/1
[3]Example 3 repeated, mole % ratio = 0.175/1 (30% less epi than in Examples 1 and 3).

TABLE 2

| Polymer | Designation | Observations |
| --- | --- | --- |
| Poly(adipic acid-co-MBAPA) | Starting Copolymer of invention | Soluble in $H_2O$ |
| Poly(adipic acid-co-MBAPA)-epi | Copolymer of invention | Gel particles, some solubility |
| Poly(adipic acid-co-MBAPA)-epi | Copolymer of U.S. Pat. No. 3,311,594 | Swelled gel formation |
| Poly(adipic acid-co-Diethylenetriamine) | Starting Copolymer of Crepetrol ® 190 | Soluble in $H_2O$ |
| Crepetrol ® 190 | Creping aid of Can. Pat. 979,579 | Swelled gel formation |
| Kymene ® 557H | Wet-strength resin | Swelled gel formation |

We claim:

1. A creping aid comprising the polyamide reaction product of a polyamide of a dicarboxylic acid or of the ester of an aliphatic dicarboxylic acid and methyl bis(3-aminopropyl)amine with epicyhlorohydrin in a mole ratio of the polyamide to the epichlorohydrin between about 1:0.1 and about 1:0.33.

2. A creping aid as claimed in claim 1, in which the mole ratio is between about 1:0.20 and about 1:0.30.

3. A creping aid as claimed in claim 1, in which the dicarboxylic acid is selected from the group consisting of oxalic, malonic, succinic, glutaric, adipic, polemic, suberic, azelaic, sebacic, maleic, fumaric, itaconic, phthalic, isophthalic and terephthalic acids, and the esters of the said dicarboxylic acids.

4. A creping aid as claimed in claim 3, in which the dicarboxylic acid is selected from the group consisting of adipic and glutaric acids.

5. A creping aid as claimed in claim 3, in with the dicarboxylic acid is adipic acid.

6. A creping aid as claimed in claim 1, in which the polyamide has an intrinsic viscosity in the range of from 0.090 to 0.225 dl/g for a 2% solution in 1 molar aqueous ammonium chloride at 25° C.

7. A creping aid as claimed in claim 6, in which the polyamide has an intrinsic viscosity in the range of from 0.10 to 0.20 dl/g.

8. A composition of matter comprising an aqueous solution of the creping aid as claimed in claim 1 containing 12 to 30% of the creping aid.

* * * * *

UNITED STATES PATENT AND TRADEMARK OFFICE
CERTIFICATE OF CORRECTION

PATENT NO. : 5,338,807
DATED : August 16, 1994
INVENTOR(S) : Herbert H. Espy and William W. Maslanka It is certified that error appears in the above-identified patent and that said Letters Patent is hereby corrected as shown below:

In the Claims, Col. 6, claim 1, line 41, "epicyhlorohydrin" should read --epichlorohydrin--;

In the Claims, Col. 6, claim 3, line 48, "polemic," should read --pimelic,--; and In the Claims, Col. 6, claim 5, line 55, "in with" should read --in which--.

Signed and Sealed this

Twenty-seventh Day of December, 1994

Attest:

*Attesting Officer*

BRUCE LEHMAN
*Commissioner of Patents and Trademarks*